July 4, 1961
F. E. HILMAR
2,991,408
MODULATION SUPPRESSOR
Filed Feb. 28, 1957
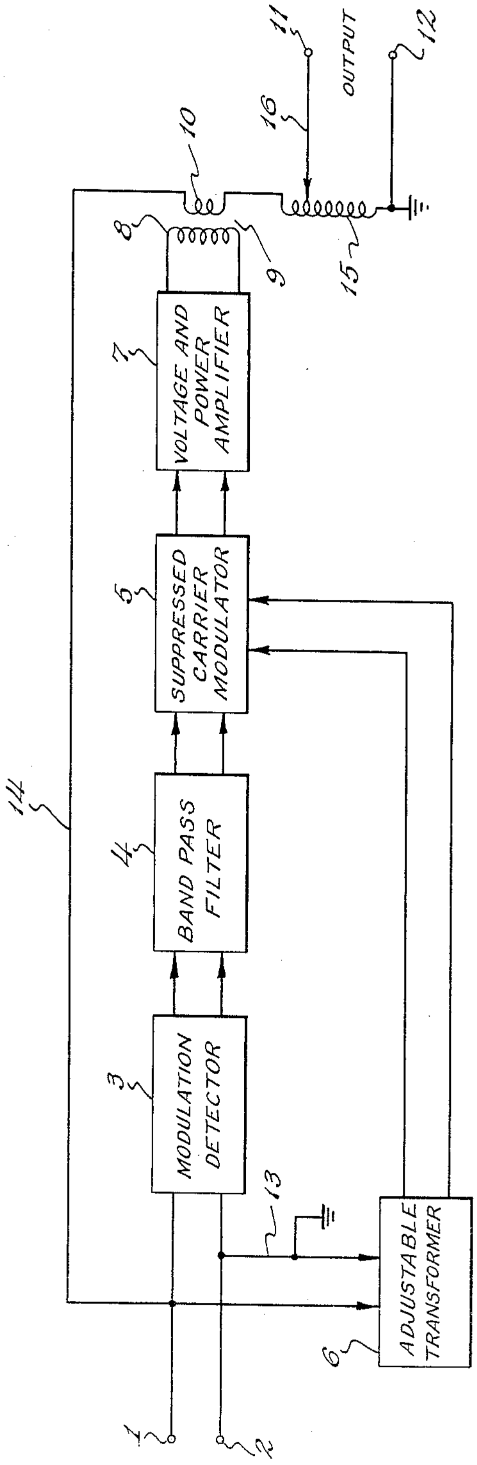
INVENTOR
FRED E. HILMAR
BY
R. V. Craddock
ATTORNEY United States Patent Office 2,991,408
Patented July 4, 1961

2,991,408

MODULATION SUPPRESSOR

Fred E. Hilmar, Levittown, N.Y., assignor to Sperry Rand Corporation, a corporation of Delaware Filed Feb. 28, 1957, Ser. No. 643,151
6 Claims. (Cl. 323—45)

The invention generally relates to regulated power supplies, and more particularly, is concerned with a system for suppressing undesirable amplitude modulation in an alternating current power supply output wave.

There are many applications, particularly in airborne power supply systems, wherein restrictive mechanical specifications make difficult the provision of lightweight, well regulated alternating current power sources. Conventional aircraft inverter type power sources, for example, are notoriously susceptible not only to frequency excursion but to amplitude modulation by spurious signals as well.

Attempts have been made in the art to remove undesirable amplitude modulation on an alternating current power signal in order to provide as pure an alternating signal as possible while retaining the advantages of using a lightweight primary power source. One proposed system contemplates the provision of a local oscillator capable of being phase synchronized with the nominal frequency of the A.C. power source. The local oscillator output is passed through a band pass filter for purposes of generating a pure carrier signal at the nominal frequency of the primary power source. The pure signal output of the filter is subtractively combined with the power source signal which contains undesirable side band components as a result of the aforementioned spurious amplitude modulation. The subtractive combination of the two signals yields only the side band frequencies present in the power signal. The resultant side band frequency signals are then subtractively combined in proper amplitude relationship with the power signal to yield a net power signal containing only the nominal frequency and not the undesired side band frequencies.

Particularly in the case of airborne alternating current power sources, it is well known that frequency excursion of the alternating power signal is a common occurrence. Therefore, any system designed to eliminate the undesired amplitude modulation of such a power signal must be adapted to operate under conditions of said frequency excursion. In the above discussed modulation suppressor technique, it becomes necessary that the local oscillator and filter closely track changes in the power supply frequency. For airborne applications, however, where the problem is likely to arise, the added complexity of adapting the local oscillator and filter for automatic tracking of the power supply frequency becomes undesirable.

It is the general object of the present invention to provide a simplified, compact, and reliable modulation suppressor for alternating current power sources.

Another object is to provide a modulation suppressor for alternating current power sources inherently capable of following frequency excursions of the power sources.

An additional object is to provide a modulation suppressor which is substantially equally effective irrespective of the percentage of modulation of the power signal.

These and other objects of the present invention, which will become more apparent in the following description, are accomplished by the provision of a modulation suppressor comprising a modulation detector adapted to receive the modulated signal output of an alternating current power source. The modulation detector output is passed through a band pass filter whose frequency limits encompass the undesired modulation frequency. The undesired modulation frequency is then applied to a suppressed carrier modulator as a modulating signal. The carrier or reference signal for the modulator is obtained from the amplitude modulated alternating current source after suitable amplitude adjustment.

The output of the suppressed carrier modulator contains only the upper and lower side bands resulting from said modulating signal and carrier signal, which side bands correspond in frequency with the undesired side bands existing in the amplitude modulated power source signal. The side band signals produced at the output of the suppressed carrier modulator are then differentially combined with the original amplitude modulated power supply signal to produce a resultant signal substantially having only one frequency component, namely, the nominal power supply frequency.

For a more complete understanding of the present invention, reference should be had to the following description and the sole figure which is a block diagram of a preferred embodiment of the present invention utilizing standard circuit components.

In the sole figure, terminals 1 and 2 are adapted to receive the output of an alternating current power source having a nominal frequency, say for example, 400 c.p.s. It is assumed that the power signal is amplitude modulated by an undesired frequency signal, for example, a signal of 16 c.p.s. The purpose of the invention is to eliminate the 16 c.p.s. modulation of the 400 c.p.s. power signal to yield a pure 400 c.p.s. power signal.

The power signal applied across terminals 1 and 2 is applied to modulation detector 3 which may consist of a conventional full wave rectifier. As is well understood in the art, if modulation detector 3 is properly balanced there will be produced at its output signals having frequencies including 800 c.p.s. and 16 c.p.s.

Said output signals are applied to band pass filter 4 which may be tuned to pass signals lying between 3 c.p.s and 500 c.p.s., for example. Thus, only the 16 c.p.s. signal appears at the output of band pass filter 4 from whence it is applied to the modulating signal input of suppressed carrier modulator 5. The carrier signal input to suppressed carrier modulator 5 is derived from the output of transformer 6, in turn receiving its excitation from the power signal appearing across terminals 1 and 2. Transformer 6 is adjusted to produce a convenient amplitude of the power source signal so that it is made large with respect to the amplitude of the modulating signal output of band pass filter 4. As is well known, a suppressed carrier modulator, for example, a ring modulator, when operated with a carrier signal large in amplitude relative to the amplitude of the modulating signal, will produce at its output substantially only the upper and lower side bands, for example, 384 c.p.s. and 416 c.p.s. It will be observed, however, that while the applied modulating signal is at 16 c.p.s., the applied carrier signal contains not only 400 c.p.s. but also the undesired sideband components of 384 c.p.s. and 416 c.p.s. Any effect due to the presence of the carrier signal side bands may be readily minimized by the conventional and simple expedient of insuring that the lowest amplitude of the modulated carrier signal applied to suppressed carrier modulator 5 is made large with respect to the amplitude of the 16 cycle modulating signal applied thereto in which case modulator 5 is negligibly sensitive to amplitude variations in the carrier signal applied thereto. The relative amplitude relationship between said signals is readily controllable by adjustment of transformer 6.

The output of suppressed carrier modulator 5, substantially consisting of only the illustrative side band frequencies of 384 c.p.s. and 416 c.p.s., is applied to voltage and power amplifier 7. Voltage and power amplifier 7 preferably includes a stabilized voltage amplifier (which may be a transformer) and output impedance reducing means (which may be one or more cathode followers). The output of amplifier 7 is applied to the primary 8 of step-down transformer 9 whose secondary 10 is placed in series with the output terminals 11 and 12. The step-down winding ratio of transformer 9 further reduces the output impedance of amplifier 7 as seen across the terminals of the secondary 10 thereof.

The top terminal of secondary 10 is connected by conductor 14 to input terminal 1. The bottom terminal of secondary 10 is connected to the upper side of auto transformer 15, the lower terminal of which is connected to ground as is conductor 13 which is connected to input terminal 2. The output wave of the power source appearing across input terminals 1 and 2 thus is applied across the series combination of auto transformer 15 and the secondary 10 of transformer 9. As previously described, the impedance across the terminals of secondary 10 of transformer 9 has been made very low so that substantially all of the power source wave amplitude is dropped across auto transformer 15, a selectable portion of which is coupled via tap 16 to output terminals 11 and 12.

In operation, the input power supply signal carrying undesired modulation is applied to detector 3 and band pass filter 4 which together operate to recover only the modulating signal. An adjustable amplitude portion of the amplitude modulated power signal is coupled via transformer 6 to the carrier input of modulator 5, the signal input to which contains only the modulating frequency. Modulator 5 produces at its output substantially only the undesired side band frequency signals which are then differentially combined with the power supply signal via transformers 9 and 15 to yield at the output terminals 11 and 12 a signal at the power supply frequency in which the undesired side bands have been subtractively cancelled.

Band pass filter 4 may consist of a conventional RC high-pass and LC low-pass filter. This type of filter tends to introduce a phase lead in the signal input to suppressed carrier modulator 5. On the other hand, however, detector 3, modulator 5, and amplifier 7 tend to introduce a compensating phase lag. By proper adjustment of the parameters, the phase lead and phase lag effects may be made equal. If necessary to facilitate the generation of the required 180° phase angle for the side band components induced across the secondary 10 of transformer 9, relative to phase of the side bands contained in the power signal, a conventional variable phase shift network may be inserted, for example, between the output of filter 4 and the input to modulator 5.

It should be observed that should the frequency of the power signal deviate from its nominal frequency, as distinguished from the undesired amplitude modulation thereof, the cancellation side band frequencies as produced at the output of modulator 5 will automatically follow the change in the frequencies of the undesired power signal side bands.

It can be seen from the preceding description that the objects of the present invention have been accomplished by the provision of apparatus adapted to receive an alternating power supply signal containing undesirable amplitude modulation and operative to extract therefrom the undesired modulating frequency. The extracted modulating frequency is then combined with an adjustable amplitude portion of the amplitude modulated power signal in a suppressed carrier modulator to produce output signals therefrom at the same frequency as the undesired side band components of the modulated power signal. The generated side band signals are then subtractively combined with the original amplitude modulated power signal to produce a resultant signal containing substantially only the nominal frequency of the power signal.

It should be noted that the voltage and power amplifier 7 supplies signals for the cancellation of the unwanted power supply signal side bands only when said undesired side bands are present. As is well understood in the art, in the absence of modulation on the power supply signal, no signal input would be applied to modulator 5 which, if properly balanced, would produce no output in the presence of only a carrier or reference signal input as derived from transformer 6.

In the event that the input power signal is amplitude modulated by more than one undesired frequency, the invention will operate to substantially eliminate all the resultant undesired side band components of the power signal so long as the power signal modulating frequencies lie within the pass band of filter 4.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In combination, first means adapted to receive an amplitude modulated signal and operative to extract therefrom the amplitude modulating signal, a suppressed carrier modulator having signal and reference inputs, means for coupling the output of said first means to said signal input of said modulator, second means for applying said modulated signal to said reference input of said modulator, and means for differentially combining the output of said modulator with said modulated signal.

2. Apparatus as defined in claim 1 wherein said second means produces a signal gain.

3. Signal regulating apparatus comprising a modulation detector adapted to receive an amplitude modulated signal and operative to recover therefrom the modulating signal, a suppressed carrier modulator having signal and reference inputs, filter means for applying said modulating signal to the signal input of said modulator, means the output of said modulator with said modulated signal. for applying said modulated signal to the reference input of said modulator, and means for differentially combining 4. Apparatus as defined in claim 3 wherein said means for differentially combining comprises a lower and a higher impedance means, said lower impedance means being coupled to the output of said modulator, and said lower and higher impedance means being serially connected to receive thereacross said modulated signal.

5. Apparatus as defined in claim 4 and further including means for deriving an output signal, said last means being connected across at least a portion of said higher impedance means.

6. A signal modulation suppressor adapted to receive an amplitude modulated carrier signal and operative to remove therefrom its component carrier sideband signals, said suppressor comprising detection means for recovering the modulating signal, means responsive to said recovered modulating signal and to said modulated signal for producing therefrom substantially only output signals having frequencies equal to said sideband signals, and means for subtractively combining said modulated signal and said output signals so as to produce a net signal having substantially a sole frequency component at said carrier frequency.

References Cited in the file of this patent

UNITED STATES PATENTS

| | | |
|---|---|---|
| 2,383,847 | Crosby | Aug. 28, 1945 |
| 2,423,866 | Woodyard | July 15, 1947 |